US006973116B2

(12) United States Patent
Popov et al.

(10) Patent No.: US 6,973,116 B2
(45) Date of Patent: Dec. 6, 2005

(54) METHOD AND DEVICE FOR EQUALIZING THE PRESSURES IN THE MELTING CHAMBER AND THE COOLING WATER SYSTEM OF A SPECIAL MELTING UNIT

(75) Inventors: Ivaylov Popov, Hanau (DE); Arno Niebling, Linsengericht (DE)

(73) Assignee: Ald Vacuum Technologies AG, Hanau (DE)

( * ) Notice: Subject to any disclaimer, the term of this patent is extended or adjusted under 35 U.S.C. 154(b) by 0 days.

(21) Appl. No.: 10/768,984

(22) Filed: Jan. 30, 2004

(65) Prior Publication Data

US 2004/0218657 A1 Nov. 4, 2004

(30) Foreign Application Priority Data

Mar. 1, 2003 (DE) ................................ 103 08 982

(51) Int. Cl.[7] ................................................ H05B 6/22
(52) U.S. Cl. ...................................... 373/158; 373/165
(58) Field of Search ................................ 373/1, 2, 4, 7, 373/42, 44–45, 56, 59, 60–61, 67, 138, 140, 373/141, 151, 152–154, 158–159, 165; 165/104.31, 165/137, 200; 266/190, 89; 432/233; 75/10.17, 75/10.45, 379

(56) References Cited

U.S. PATENT DOCUMENTS 3,995,687 A * 12/1976 Euler ......................... 165/200
4,301,320 A * 11/1981 Hochstrasser et al. ...... 373/165
6,790,254 B1 * 9/2004 Feichtinger et al. .......... 75/379

FOREIGN PATENT DOCUMENTS

DE 37 21 945 A1 5/1988

* cited by examiner

*Primary Examiner*—Tu Hoang
(74) *Attorney, Agent, or Firm*—Fulbright & Jaworski L.L.P.

(57) ABSTRACT

The invention relates to a method and a device for equalizing the pressures in the melting chamber and in the cooling water system of a special melting unit, for example a pressure electroslag remelting (PESR) unit having a copper ingot mold, or a pressure induction furnace having an induction coil and a cooling water system, designed as a closed, separate pressure circuit.

5 Claims, 1 Drawing Sheet

METHOD AND DEVICE FOR EQUALIZING THE PRESSURES IN THE MELTING CHAMBER AND THE COOLING WATER SYSTEM OF A SPECIAL MELTING UNIT

BACKGROUND AND SUMMARY OF THE INVENTION

This application claim priority from German 103 08 982.9-24 filed Mar. 1, 2003. hereby incorporated by reference in its entirety.

The invention relates to a method and a device for equalizing the pressures in the melting chamber and in the cooling water system of a special melting unit, for example a pressure electroslag remelting (PESR) unit having a copper ingot mold, or a pressure induction furnace having an induction coil and a cooling water system, designed as a closed, separate pressure circuit.

In one known method and device for operating a pressure electroslag remelting unit (DE 37 21 945), the pressure of the water used for cooling is kept sufficiently high so that it neither rises above nor falls below the gas pressure inside the unit by more than 5 bar. The water is circulated in a closed pressurized water circuit. The heat released to the cooling water via the ingot mold is led to a heat exchanger for recooling. When the cooling water pressure drops, excess water is discharged on one side and gas is discharged on the other side. To this end, in the pressurized water circuit a closing element is opened on the gas side, and at a predetermined pressure is automatically closed. The closing element is actuated by the piston in the piston-type accumulator, the closing element being spring-loaded and the closing pressure being adjustable by the spring pretension. To compensate for cooling water losses from the cooling water system, a pump for leaking water and a feed line for leaking water are provided, the piston in the piston-type accumulator being held in the center position.

One disadvantage of the known method is that the cooling water pressure is maintained over an excessively wide range, namely +/−5 bar.

A further disadvantage of the known method is the limited possibility for counteracting a pressure rise in the cooling water chamber or in the melting chamber, which in practice could result in hazardous situations or even catastrophes. In DE 37 21 945 a counteraction is provided only in the event of a pressure drop.

A further disadvantage of the known device lies in the direct connection between the melting chamber of the unit and the pressure-compensating piston-type accumulator. Experience has shown that the direct connection leads to contamination and corrosion of the interior of the piston-type accumulator as a result of corrosive gases and contaminants carried over from the melting chamber. The contamination results in impairment of the sliding properties of the inner wall of the piston-type accumulator, the sliding surface of the piston, and the piston rod connected thereto. The result is impairment of the system function caused by jerky motions of the piston. The pressure on both ingot mold side walls is no longer dynamically equalized, but instead changes abruptly, additionally resulting in intermittent mechanical stresses on the ingot mold wall. Such intermittent stresses must be absolutely avoided, however, since otherwise a delay of the copper crucible in the melting range can occur, in particular when as a result of the operating conditions the temperature of the slag bath becomes very high during remelting, so that the inner wall temperature of the copper rises to values at which the yield point of the copper is low thereafter. At temperatures above 200° C. an unacceptable bulge in the copper crucible results, which in the worst-case scenario can lead to the ingot being caught in the ingot mold.

The object of the present invention is to provide a method and a device for equalizing the pressures in the melting chamber and in the cooling water system of a special melting unit, for example a pressure electroslag remelting (PESR) unit having a copper ingot mold, or a pressure induction furnace having an induction coil and a cooling water system, for which the pressure equalization occurs in a much narrower range, for example at +/−0.5 bar, and for which no abrupt pressure changes are possible on either of the ingot mold side walls.

In the event of a pressure rise in one of the two chambers—the melting chamber of the unit and the cooling water chamber for the copper ingot mold or interior of the induction coil—the method is also intended to provide counteraction in such a way that the copper wall of the ingot mold or of the induction coil undergoes no unacceptable mechanical stress.

The device for the method is intended to assure the dynamic pressure equalization at the two side walls, whereby the sliding properties of the inner wall of the piston-type accumulator and of the surface area of the piston should remain over a long period of time.

The device should also be easy to repair and maintain.

This object is achieved according to the invention by a method in which the pressure difference is maintained in a range from 0 to +/−0.5 bar, whereby the gas from the melting chamber of the unit is first led into an intermediate vessel containing hydraulic liquid, and only then is the hydraulic liquid supplied to one of the two chambers of a piston-type accumulator, whereby, corresponding to a pressure drop or pressure rise in one of the two media, counteraction is provided by discharging excess gas or by additional repumping of cooling water, or vice versa, and the direction of the countereffect for a pressure drop or pressure rise is determined by the magnitude and rate of the pressure drop/pressure rise.

The device for the method essentially comprises a piston-type accumulator which is subdivided by a piston into two variable-volume chambers, whereby the one chamber is connected via a pipe and control fittings to the cooling water circuit for the ingot mold or the induction coil. A heat exchanger, one or more circulating pumps, and an additional high pressure water refill pump are correspondingly provided in this cooling water circuit.

BRIEF DESCRIPTION OF THE DRAWING

The FIGURE depicts a device according to the present invention.

DETAILED DESCRIPTION

Figure 1:
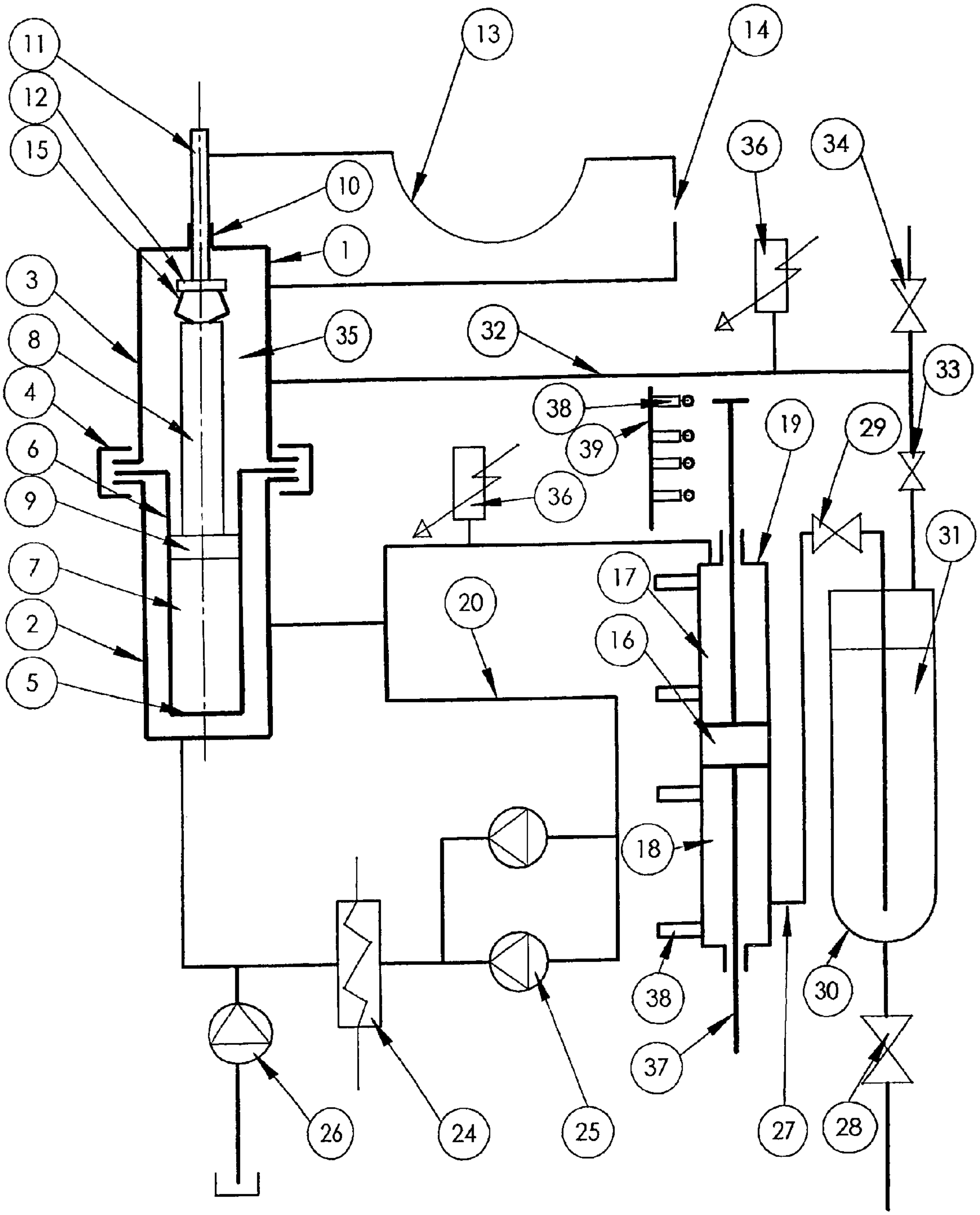

According to the invention, the other chamber of the piston-type accumulator is connected via an additional pipe and control fittings to an intermediate vessel which is partially filled with a hydraulic liquid, the intermediate vessel being connected via an additional pipe with control and shutoff fittings to the melting chamber of the PESR unit or of the pressure induction furnace, and one or more pressure sensors being mounted in each of the above-referenced pipes, whereby, corresponding to the design pressure of the unit, the piston-type accumulator may be designed as a hydraulic cylinder with a continuous piston rod or as a pneumatic cylinder with a magnetic piston, and the high pressure water refill pump is designed as a metering pump.

The invention allows many different types of possible embodiments; one of these is illustrated in purely schematic form in the accompanying drawing.

A pressure electroslag remelting unit essentially comprises a pressure vessel 1 which is composed of a cooling crucible 2 and a furnace hood 3 which can be closed pressure- and vacuum-tight by a bayonet lock 4. Cooling crucible 2 accommodates a copper ingot mold 6, closed off from below by a bottom plate 5, in which a remelt ingot 7 is formed by melting off consumable electrode 8 in slag 9.

Furnace hood 3 has on its upper end a pressure bushing 10 through which an electrode rod 11, used as the high-current supply line, with a high-current connector 12 extends into the interior of the unit. Electrode rod 11 is connected on one end via a high-current cable 13 to power source 14, and is connected on the other end via a high-current terminal 15 to consumable electrode 8.

In addition, a piston-type accumulator 19 which is subdivided by a piston 16 into two variable-volume chambers 17 and 18 is provided in cooling water circuit 20 for copper ingot mold/induction coil 6. A heat exchanger 24, one or more circulating pumps 25, and an additional high pressure water refill pump 26 are correspondingly provided in cooling water circuit 20. According to the invention, the other chamber 18 of piston-type accumulator 19 is connected via pipe 27 and control fittings 28, 29 to an intermediate vessel 30 which is partially filled with a hydraulic liquid 31. Intermediate vessel 30 is connected via an additional hydraulic line 32 with control and shutoff fittings 33, 34 to melting chamber 35 of the PESR unit or of the pressure induction furnace. One or more pressure sensors 36 are respectively mounted in each of the above-referenced pipes. Piston-type accumulator 19 may be designed as a hydraulic cylinder with a continuous piston rod 37 or as a pneumatic cylinder with a magnetic piston. Depending on the piston-type accumulator design, position switches 38 are attached either on an additional track 39 parallel to the piston rod, or directly to wall 40 of the pneumatic cylinder. High pressure water refill pump 26 has been selected as a metering pump.

The object upon which the invention is based is achieved by the fact that piston 16 in piston-type accumulator 19 is acted on by the pressure in melting chamber 35 and by the pressure in cooling crucible 2 solely by means of liquids. The process gas introduced into melting chamber 31 acts primarily via line 27 on hydraulic oil 31 present in intermediate vessel 30, whereby the hydraulic oil correspondingly adjusts the pressure in storage chamber 17 via hydraulic line 32 Other functions such as rapid replacement of the hydraulic liquid, ventilation of the pipe system, or detection of pressure are provided by additional fittings in the piping of the system.

Continuous piston rod 37 or magnetic piston 16 is also used for actuating position switches 38, so that the extreme motions of piston 16, in particular during transmission processes such as filling the unit with process gas, are detected and relayed to the control system for the unit.

Since a gas pressure is present in melting chamber 35 which is different from atmospheric pressure, by use of the device according to the invention the pressure of the cooling water is compared to the melting pot pressure, thereby assuring that cooling water and process gas never come into direct contact with one another.

Pressure-transmitting piston 16 "floats" between two liquids, so that the friction between piston 16 and the inner wall of piston-type accumulator 19 is minimum and constant. As a result of the minimized friction between piston 16 and the inner wall of the cylinder, the system operates in a particularly sensitive manner.

The service life of the device is particularly long, since no corrosion and/or contamination whatsoever is to be expected in the equalizing device.

REFERENCE NUMBER LIST

LISTING OF INDIVIDUAL COMPONENTS

1 Pressure vessel
2 Cooling crucible
3 Furnance hood
4 Bayonet lock
5 Bottom plate
6 Copper ingot mold
7 Remelt Ingot
8 Electrode
9 Slag
10 Pressure bushing
11 Electric rod
12 High-current connector
13 High-current cable
14 Power source
15 High-current source
16 Piston
17 Variable-volume chamber
18 Variable-volume chamber
19 Piston-type accumulator
20 Cooling water circuit
21
22
23
24 Heat exchanger
25 Circulating pump
26 High pressure water refill pump
27 Pipe
28 Control fitting
29 Control fitting
30 Intermediate vessel
31 Hydraulic liquid
32 Hydraulic line
33 Control and shutoff fitting
34 Control and shutoff fitting
35 Melting chamber
36 Pressure sensor
37 Piston rod
38 Position switch
39 Track
40 Wall It is claimed:

1. A method for equalizing the pressures in a melting chamber and in the cooling water system for an ingot mold/induction coil circuit of a special melting unit, comprising:
   - comparing a pressure of cooling water to a pressure of process gas in a melting chamber of the unit, wherein a pressure difference is maintained in a range from 0 to +/−0.5 bar;
   - feeding a process gas from the melting chamber of the unit first into an intermediate vessel containing hydraulic liquid, and only then supplying said hydraulic liquid to one of two chambers of a piston-type accumulator, whereby, corresponding to a pressure drop or pressure rise in one of the process gas or cooling water, counteraction is provided by adjusting at least one of the pressure of the process gas or the flow of cooling water, and determining the direction of the countereffect for a pressure drop or pressure rise by the magnitude and rate of one of a pressure drops or a pressure rise to equalize the pressures in the melting chamber and in the cooling system.

2. A device for equalizing the pressures in the melting chamber and in the cooling water system of a special melting unit comprising:

a cooling water circuit;

a piston-type accumulator which is subdivided by a piston into a first and a second variable-volume chamber in said cooling water circuit for an ingot mold/induction coil, wherein the first chamber of said piston-type accumulator is connected via a pipe and control fittings to said cooling water circuit for the ingot mold/induction coil, to a heat exchanger; one or more circulating pumps; an additional high pressure water refill pump correspondingly provided in said cooling water circuit, wherein said second chamber of the piston-type accumulator is connected via an additional pipe and a control fitting to an intermediate vessel which is partially filled with a hydraulic liquid, wherein said intermediate vessel is connected via an additional hydraulic line having control and shutoff fittings to the melting chamber, and at least one pressure sensor respectively mounted in each of said pipes whereby, corresponding to the design pressure of the unit, the piston-type accumulator is a hydraulic cylinder with a continuous piston rod or a pneumatic cylinder with a magnetic piston, and the high pressure water refill pump is a metering pump.

3. The device according to claim 2, wherein the pipe between the vessel and the furnace hood above the liquid-filled chamber of the vessel leads into this vessel, and the piston-type accumulator is situated in a plane below the plane of the vessel.

4. A device according to claim 2, wherein the piston rod of the piston-type accumulator extends through both end walls of the piston-type accumulator, and cooperates with position switches by which the valves in the pipes which are connected to the vessel can be actuated.

5. A device according to claim 2, wherein the piston rod of the piston-type accumulator extends through both end walls of the piston-type accumulator, and cooperates with position switches by which the valves in the pipes which are connected to the vessel can be actuated.

* * * * *